(12) United States Patent
Darrow, Jr.

(10) Patent No.: US 10,648,340 B2
(45) Date of Patent: May 12, 2020

(54) HIGH MODULUS HYBRID MATERIAL ROTOR BLADE SPAR

(71) Applicant: Sikorsky Aircraft Corporation, Stratford, CT (US)

(72) Inventor: David A. Darrow, Jr., Stratford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 428 days.

(21) Appl. No.: 14/915,162

(22) PCT Filed: Aug. 7, 2014

(86) PCT No.: PCT/US2014/050090
§ 371 (c)(1),
(2) Date: Feb. 26, 2016

(87) PCT Pub. No.: WO2015/069344
PCT Pub. Date: May 14, 2015

(65) Prior Publication Data
US 2016/0208616 A1    Jul. 21, 2016

Related U.S. Application Data

(60) Provisional application No. 61/871,125, filed on Aug. 28, 2013.

(51) Int. Cl.
  *F01D 5/14*        (2006.01)
  *B29D 99/00*      (2010.01)
  (Continued)

(52) U.S. Cl.
  CPC ............. *F01D 5/147* (2013.01); *B29C 70/20* (2013.01); *B29C 70/30* (2013.01);
  (Continued)

(58) Field of Classification Search
  CPC ......... F01D 5/147; B29C 70/20; B29C 70/02; B29C 70/08; B29C 70/30; B29C 70/205;
  (Continued)

(56) References Cited

U.S. PATENT DOCUMENTS

| 3,528,753 A | 9/1970 | Dutton et al. |
| 5,127,802 A | 7/1992 | Carlson et al. |

(Continued)

FOREIGN PATENT DOCUMENTS

| GB | 2451192 A | 1/2009 |
| WO | 9606776 A1 | 3/1996 |
| WO | 9932273 A1 | 7/1999 |

OTHER PUBLICATIONS

International Search Report, International Application No. PCT/US20141050090, dated Apr. 3, 2014, pp. 1-9.
(Continued)

*Primary Examiner* — Kenneth J Hansen
*Assistant Examiner* — Justin A Pruitt
(74) *Attorney, Agent, or Firm* — Cantor Colburn LLP (57) ABSTRACT

A composite spar having an upper and lower wall region connected by leading and trailing edge regions is provided including a plurality of first laminates and a plurality of second laminates. The plurality of first laminates includes one or more intermediate modulus graphite plies having an intermediate modulus. The plurality of first laminates is arranged in one or more intermediate modulus layers to form at least a portion of the upper wall region, lower wall region, leading edge region and trailing edge region. The plurality of second laminates includes one or more high modulus graphite plies having a high modulus. The plurality of second laminates is arranged in one or more high modulus layers. The high modulus layers are generally interposed between intermediate modulus layers.

15 Claims, 6 Drawing Sheets

(51) Int. Cl.
  *B29C 70/20* (2006.01)
  *B29C 70/30* (2006.01)
  *B29K 105/10* (2006.01)
  *B29K 307/04* (2006.01)
  *B29L 31/08* (2006.01)
  *B29K 63/00* (2006.01)
  *B29K 105/00* (2006.01)

(52) U.S. Cl.
  CPC ...... *B29D 99/0025* (2013.01); *B29K 2063/00* (2013.01); *B29K 2105/106* (2013.01); *B29K 2105/253* (2013.01); *B29K 2307/04* (2013.01); *B29K 2995/0082* (2013.01); *B29L 2031/082* (2013.01)

(58) Field of Classification Search
  CPC ... B29C 53/42; B29C 53/50; B29C 66/70–74; B29K 2063/00; B29K 2105/105; B29K 2105/106; B29K 2307/04; B29K 2995/0082; B29K 2105/253; B29K 2105/258; B29L 2031/082; B29L 2031/087; B29D 99/0025; B29D 99/0028; B23P 15/04; B64C 2027/4736
  See application file for complete search history.

(56) References Cited

U.S. PATENT DOCUMENTS

| | | | |
|---|---|---|---|
| 5,188,872 A * | 2/1993 | Quigley | B29C 53/8058 114/102.31 |
| 5,222,297 A | 6/1993 | Graff et al. | |
| 5,248,242 A | 9/1993 | Lallo et al. | |
| 5,520,532 A | 5/1996 | Reinfelder et al. | |
| 5,755,558 A | 5/1998 | Reinfelder et al. | |
| 2011/0052405 A1* | 3/2011 | Parkin | F01D 5/147 416/230 |

OTHER PUBLICATIONS

Written Opinion of the International Searching Authority, International Application No. PCT/US2014/050090, dated Apr. 3, 2014, pp. 1-6.
C.F. Griffin, "Increased Rotor Blade Survivability", AD-A016 929 Lockheed-California Company, Prepared for Army Air Mobility Research and Development Laboratory, Aug. 1975, pp. 1-88.
Calfee Design, "Grades of Carbon Fiber", downloaded from http://calfeedesign.com/tech-papers/grades-of-carbon-fiber/ on Oct. 25, 2013, pp. 1-2.
Devereaux Aviation, "D.A. Rotor Blades", downloaded from http://devereauxaviation.com/rotor-blades.html on Oct. 25, 2013, pp. 1-4.
EP Communication; Extended European Search Report; Application No. 14860614.8-1703/3038813 PCT/US2014050090; dated Jun. 7, 2017; pp. 1-7.
Gurit, "SparPreg UD Prepreg Spar Solution", downloded from http://www.gurit.com/files/documents/spar-brochurev2pdf.pdf on Oct. 25, 2013, pp. 1-16.
PCT International Preliminary Report on Patentability; International Application No. PCT/US2014/050090; International Filing Date: Aug. 7, 2014; dated Mar. 1, 2016; pp. 1-7.
Unicopter.com, "Design: Synchrolite ~ Rotor—Blade—Composite", downlaoded from http://www.unicopter.com/B188.html on Oct. 25, 2013, pp. 1-13.

* cited by examiner

HIGH MODULUS HYBRID MATERIAL ROTOR BLADE SPAR

CROSS-REFERENCE TO RELATED APPLICATIONS

This application claims the benefit of U.S. provisional patent application Ser. No. 61/871,125 filed Aug. 28, 2013, the entire contents of which are incorporated herein by reference.

STATEMENT REGARDING FEDERALLY SPONSORED RESEARCH OR DEVELOPMENT

This invention was made with Government support under Technology Investment Agreement W911W6-13-2-003 with the United States Army. The Government has certain rights in the invention.

BACKGROUND OF THE INVENTION

Exemplary embodiments of the invention generally relate to a hollow composite member for a rotary wing aircraft, and more particularly, to the process and apparatus used to manufacture of the composite rotor blades of a rotary wing aircraft.

Rotor blades are a critical component of every helicopter. The rotor blades are subjected to a complex set of rather extreme aerodynamic forces that vary continually during flight. The rotor blades function as rotating airfoils or wings that are shaped to provide the aerodynamic lift required for a given aircraft. Rotor blades typically include a spar that extends from the root of the rotor blade to its tip. The spar is a major structural element of the rotor blade that provides the blade with the structural strength needed to carry high operational loads.

The typical rotor blade spar is a long tubular structure around which the rest of the blade is formed. The spar tube has an elliptical cross-section that is formed to provide a forward or leading edge and rearward or trailing edge. In order to provide optimum aerodynamic performance, many spar tubes include a slight twist about the longitudinal axis. Typical twists in the spar provide rotations of the elliptical cross-section of up to 10 degrees and more as one moves from the root of the rotor blade to its tip. In addition, the elliptical shape of the spar cross-section may be varied from the spar root to the spar tip to meet a variety of aerodynamic and structural loading parameters.

High strength materials, such as titanium and aluminum alloys, have typically been used to make rotor blades. These high strength metal materials are particularly well suited for forming the rotor blade spar. Titanium has been routinely formed into the relatively long, tubular spar structure and machined or otherwise fabricated to provide a complex variety of twists and varying cross-sectional shapes.

Composite materials have also been used to form rotor blade spars. Their combination of light weight and structural strength has made composites a popular choice for making not only the rotor blade spar, but the entire rotor blade.

BRIEF DESCRIPTION OF THE INVENTION

According to one embodiment of the invention, a composite spar having an upper and lower wall region connected by leading and trailing edge regions is provided including a plurality of first laminates and a plurality of second laminates. The plurality of first laminates includes one or more intermediate modulus graphite plies having an intermediate modulus. The plurality of first laminates is arranged in one or more intermediate modulus layers to form at least a portion of the upper wall region, lower wall region, leading edge region and trailing edge region. The plurality of second laminates includes one or more high modulus graphite plies having a high modulus. The plurality of second laminates is arranged in one or more high modulus layers. The high modulus layers are generally interposed between intermediate modulus layers.

In addition to one or more of the features described above, or as an alternative, in further embodiments the high modulus layers are arranged only within the upper wall region and the lower wall region.

In addition to one or more of the features described above, or as an alternative, in further embodiments the plies of graphite fibers having an intermediate modulus have a stiffness between about 18 msi and about 22 msi.

In addition to one or more of the features described above, or as an alternative, in further embodiments the plies of graphite fibers having a high modulus have a stiffness between about 25 msi and about 37 msi.

In addition to one or more of the features described above, or as an alternative, in further embodiments at least one of the plurality of first laminates may be a unidirectional laminate.

In addition to one or more of the features described above, or as an alternative, in further embodiments at least one of the plurality of second laminates include fibers oriented generally parallel to a longitudinal axis.

According to another embodiment of the invention, a method of forming a spar is provided including wrapping a first intermediate modulus graphite layer about a periphery of a mandrel. A high modulus graphite layer including is arranged over a portion of the first intermediate modulus layer. A second intermediate modulus graphite layer is positioned about the periphery of the mandrel and over the high modulus graphite layer such that the high modulus layer is interleaved between the intermediate modulus layer and the another intermediate modulus layer.

In addition to one or more of the features described above, or as an alternative, in further embodiments the high modulus layer is arranged over only a first surface and a second opposite surface of the mandrel to form a portion of an upper wall region and a lower wall region of the spar.

In addition to one or more of the features described above, or as an alternative, in further embodiments another high modulus layer including one or more plies of graphite fibers having the high modulus is arranged over a portion of the another intermediate modulus layer. A further intermediate modulus layer is positioned about the periphery of the another intermediate modulus layer such that the another high modulus layer is interleaved between the further intermediate modulus layer and the another intermediate modulus layer.

A rotor blade for a rotary wing aircraft is provided including a substantially hollow spar. The spar includes a plurality of first laminates and a plurality of second laminates. The plurality of first laminates includes one or more intermediate modulus graphite plies having an intermediate modulus. The plurality of first laminates is arranged in one or more intermediate modulus layers to form at least a portion of the upper wall region, lower wall region, leading edge region and trailing edge region of the spar. The plurality of second laminates includes one or more high modulus graphite plies having a high modulus. The plurality of second laminates is arranged in one or more high modulus layers. The high modulus layers are generally interposed between intermediate modulus layers. A plurality of airfoil blocks is positioned about the spar to define an airfoil shape and at least one skin extends around an exterior of the plurality of airfoil blocks to define a smooth exterior surface.

In addition to one or more of the features described above, or as an alternative, in further embodiments the high modulus layers are arranged only within the upper wall region and the lower wall region.

In addition to one or more of the features described above, or as an alternative, in further embodiments the plies of graphite fibers having an intermediate modulus have a stiffness between about 18 msi and about 22 msi.

In addition to one or more of the features described above, or as an alternative, in further embodiments the plies of graphite fibers having a high modulus have a stiffness between about 25 msi and about 37 msi.

In addition to one or more of the features described above, or as an alternative, in further embodiments at least one of the plurality of first laminates may be a unidirectional laminate.

In addition to one or more of the features described above, or as an alternative, in further embodiments at least one of the plurality of second laminates include fibers oriented generally parallel to a longitudinal axis.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1A:
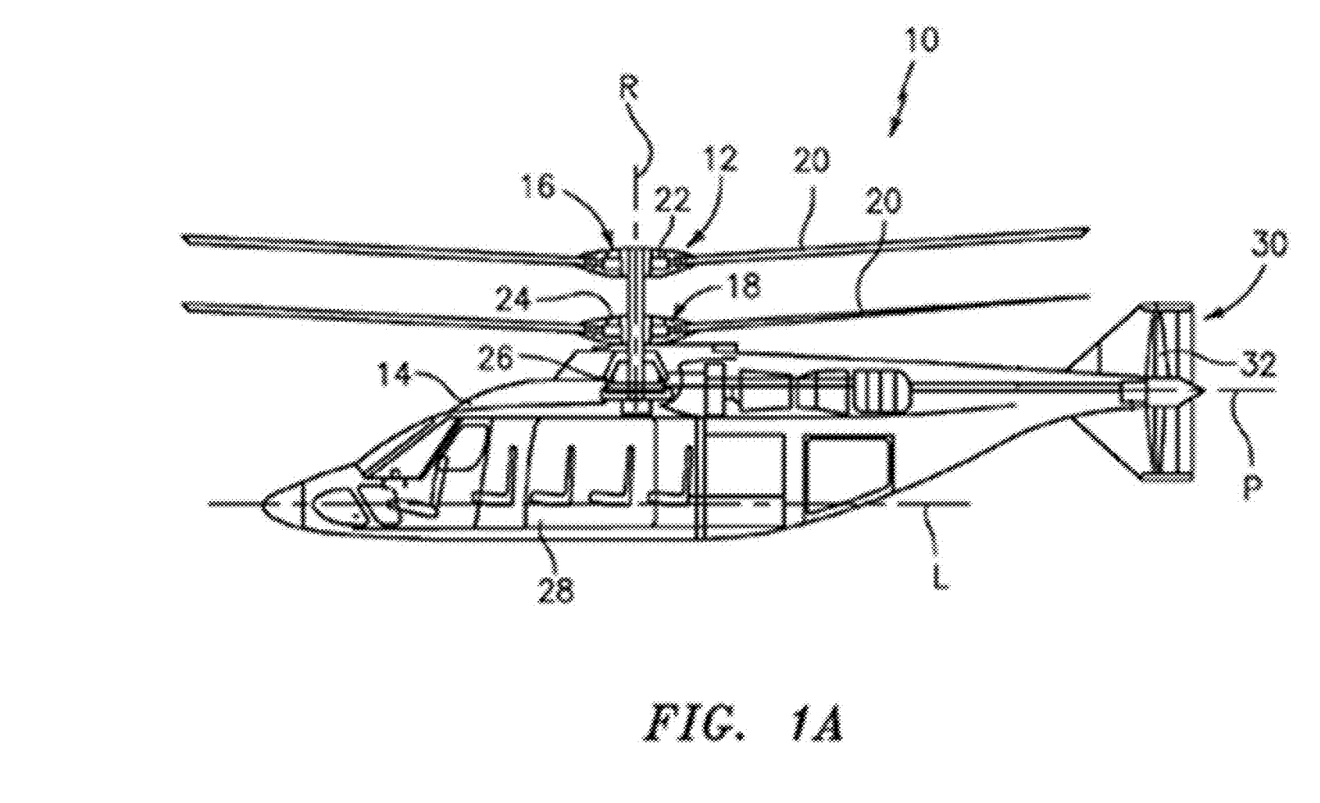
FIG. 1 is a perspective view of an example of a rotary wing aircraft.
Figure 1B:
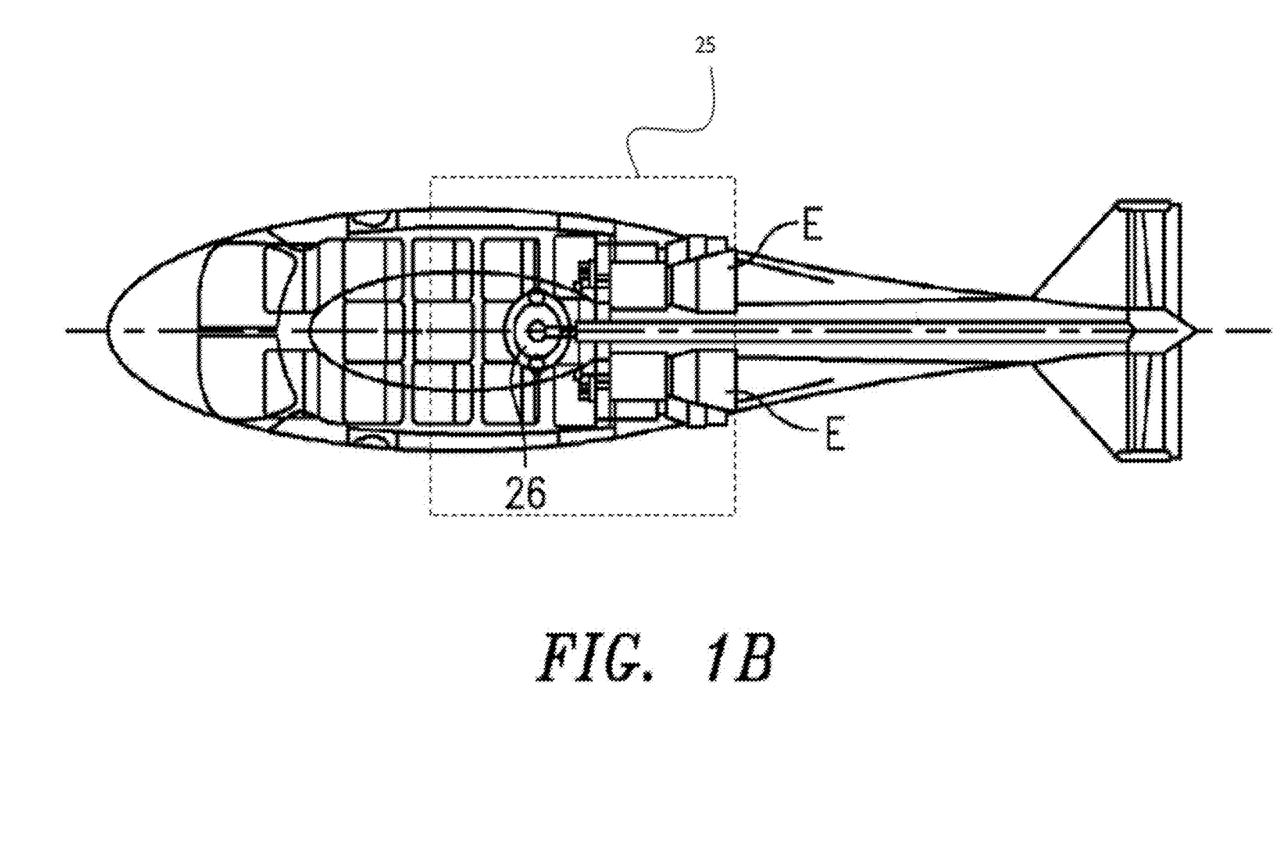

FIGS. 1A and 1B illustrate an exemplary vertical takeoff and landing (VTOL) high speed compound or coaxial contra-rotating rigid rotor aircraft 10 having a dual, contra-rotating main rotor system 12, which rotates about a rotor axis of rotation R. The aircraft includes an airframe 14 which supports the dual, contra-rotating, coaxial main rotor system 12 as well as a translational thrust system 30 which provides translational thrust generally parallel to an aircraft longitudinal axis L.

The main rotor system 12 includes an upper rotor system 16 and a lower rotor system 18. A plurality of rotor blade assemblies are 20 mounted to a rotor hub 22, 24 of each rotor system 16, 18, respectively. The main rotor system 12 is driven by a transmission 25. The translational thrust system 30 may be any propeller system including, but not limited to a pusher propeller, a tractor propeller, a nacelle mounted propeller etc. The illustrated translational thrust system 30 includes a pusher propeller system 32 with a propeller rotational axis P oriented substantially horizontal and parallel to the aircraft longitudinal axis L to provide thrust for high speed flight. The translational thrust system 30 may be driven through the main gearbox 26 which also drives the rotor system 12.

The transmission 25 includes a main gearbox 26 driven by one or more engines, illustrated schematically at E. The main gearbox 26 and engines E are considered as part of the non-rotating frame of the aircraft 10. In the case of a rotary wing aircraft, the gearbox 26 may be interposed between one or more gas turbine engines E, the main rotor system 12 and the translational thrust system 30. In one embodiment, the main gearbox 26 is a split torque gearbox which carries torque from the engines E through a multitude of drivetrain paths. Although a particular rotary wing aircraft configuration is illustrated and described in the disclosed non-limiting embodiment, other configurations and/or machines with rotor systems are within the scope of the present invention.

Figure 2:
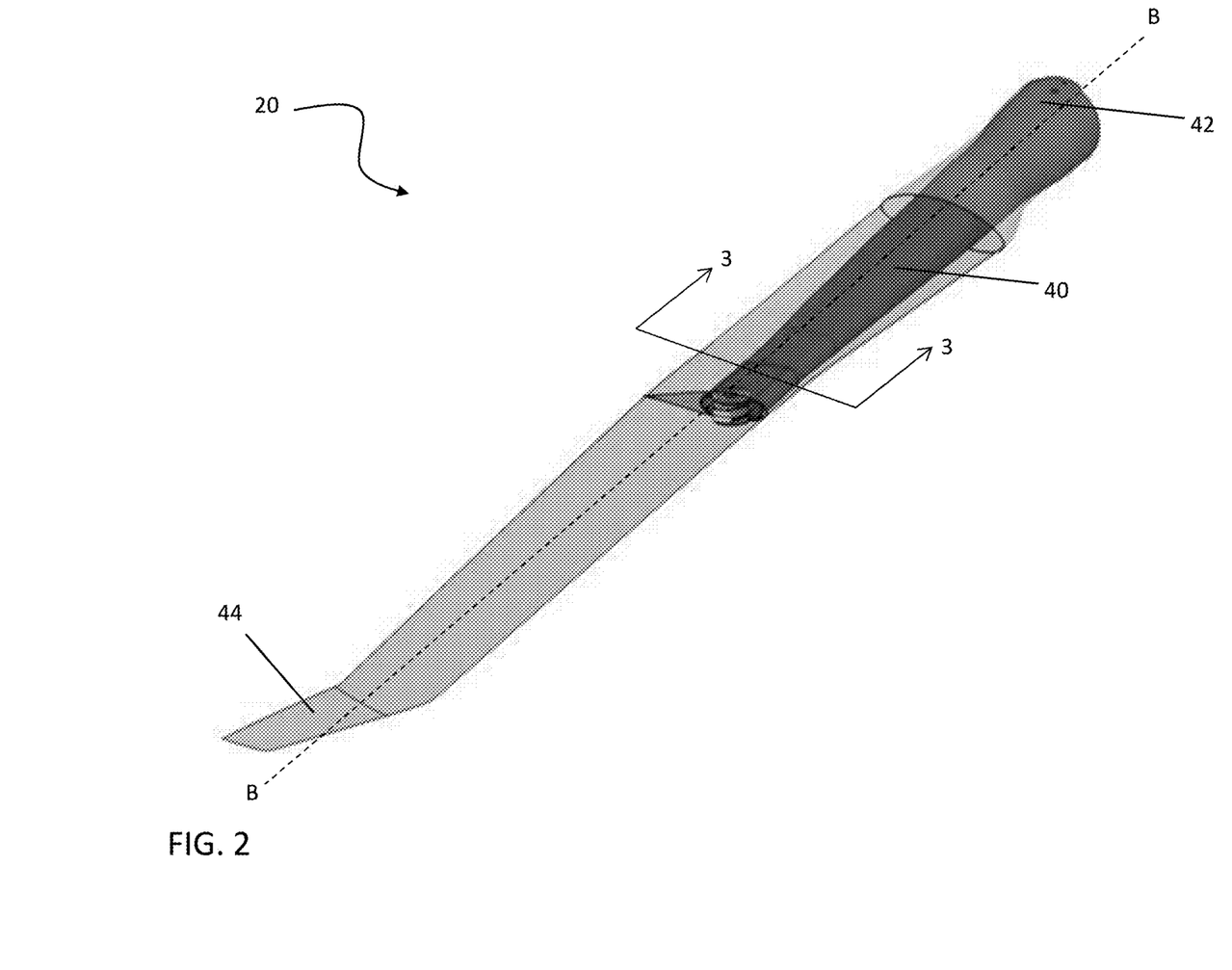
FIG. 2 is a perspective view of a rotor blade assembly of a rotor system of the rotary wing aircraft of FIG. 1.
Figure 3:
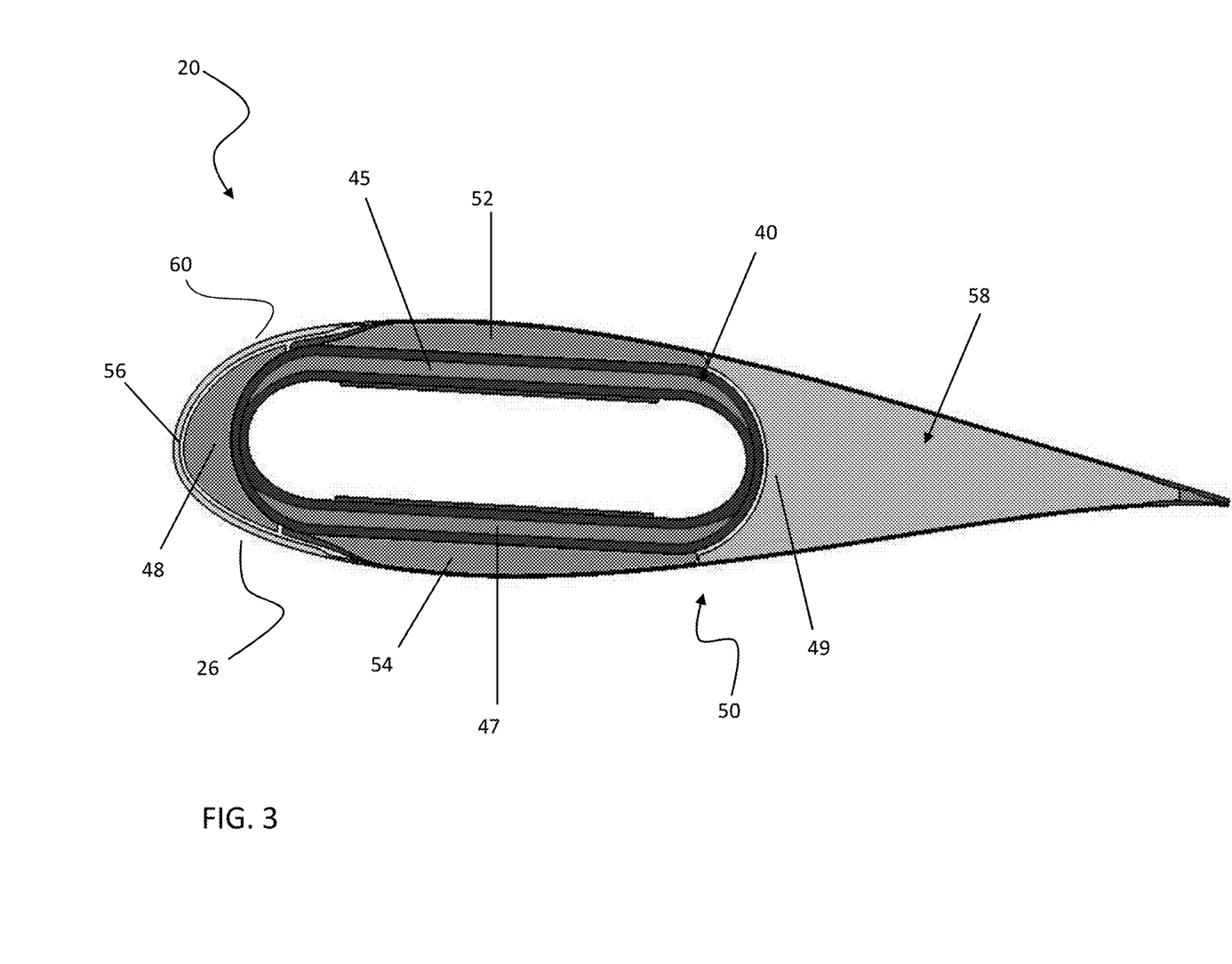
FIG. 3 is a cross-sectional view of the rotor blade assembly of FIG. 2 taken A-A.

Referring now to an exemplary rotor blade assembly 20 illustrated in FIGS. 2 and 3, a generally hollow, tubular spar 40 configured to couple to one of the rotor hubs 22, 24 at an inboard end 42 extends over at least a portion of the length of the rotor blade assembly 20 along a longitudinal axis B. In one embodiment, the spar 40 extends to the blade tip 44 of the rotor blade assembly 20. The cross-section of the spar 40 may vary in size and shape over the length of the spar 40 depending on the contour of the rotor blade assembly 20. The spar 40 is a structural member having a high torsional and axial stiffness and strength and, therefore, may be made from a high strength material, including but not limited to metal, graphite, fiberglass or some combination thereof. While shown with tip 44 having swept geometry, it is understood that the tip 44 need not have a swept geometry in all embodiments of the invention.

A plurality of blocks 50 bonded to the spar 40 (see FIG. 3) generate the airfoil shape of the rotor blade 20. The plurality of blocks 50 may include a composite material, such as formed through compression molding, an additive manufacturing process, or any combination of processes for example. Alternatively, the blocks 50 may include a generally foam or honeycomb material. An upper airfoil block 52 is connected to the upper wall 45 of the spar 40, and a lower airfoil block 54 is fastened opposite the upper airfoil block 52, adjacent the lower wall 47 of the spar 40. Similarly, a leading edge block 56 and a core 58 are bonded opposite one another about the spar 40, to a conic leading edge sidewall 48 and trailing edge sidewall 49, respectively. One or more skins 60 (such as an upper skin and a lower skin for example) extend around an exterior of the plurality of blocks 50 positioned about the spar 40. The skin 60 provides the rotor blade assembly 20 with a generally uniform, smooth, exterior surface.

As shown, the spar 30 has a hollow interior 33 defined by the inner mold line of the upper wall 34, the lower wall 36, the leading edge sidewall 38, and the trailing edge sidewall 39. As shown, the upper and lower walls 34, 36 are thicker as compared to the edge sidewalls 38, 39. The additional thickness is due to additional high modulus graphite layers disposed on the upper and lower walls 34, 36 that are not present in the edge sidewalls 38, 39. As will be described in relation to FIG. 4 below, all of the walls 34, 36, 38, and 39 include intermediate modulus graphite layers to allow for chordwise (along the chord of the blade 22) stiffness and improved fatigue characteristics, and the additional high modulus graphite layers in the upper and lower walls 34, 36 provide additional flatwise (spanwise along the blade 22) stiffness and therefore are thicker in comparison to the edge sidewalls 38, 39.

As will be apparent in the detailed discussion that follows, the orientation, location, and material selection is critical to providing structural and weight efficiency while also facilitating ease of manufacture. The spar 40 is comprised of a plurality of layers or plies having fibers, such as glass, carbon, or graphite fibers for example, arranged within a pre-preg material. In one embodiment, the composite spar 40 is formed from multiple plies, similar to a tape, including graphite fibers; a portion being high modulus graphite plies and another portion including intermediate modulus graphite plies. The high modulus graphite plies generally have stiffness between about 25 msi and about 37 msi and the intermediate modulus graphite plies have a stiffness between about 18 msi and about 22 msi. One or more high modulus graphite plies may be combined to form a high modulus laminate. Similarly, one or more intermediate modulus graphite may be combined to form an intermediate modulus laminate. The intermediate modulus laminates are configured to provide the necessary strength to the spar 40 and the high modulus laminates are configured to provide the necessary stiffness to the spar 40.

Generally, the fibers within any one ply are continuous and unidirectionally oriented, and the plies may be stacked atop one another at various angles. If each of the plurality of plies stacked within a laminate has a substantially similar fiber orientation, the laminate is referred to as "unidirectional." Alternatively, if one or more of the plurality of plies stacked within a laminate has a varying fiber orientation, the laminate is referred to as a "cross-ply." In one embodiment, a plurality of epoxy impregnated fiber reinforced plies are arranged to form individual cross-ply pairs. In a cross-ply pair, one ply having fibers oriented in a positive angle is combined with another ply having fibers oriented in an equal negative angle relative to the longitudinal axis of the ply. One or more cross-ply pairs may be stacked and arranged to form a cross-ply laminate.

Figure 4:
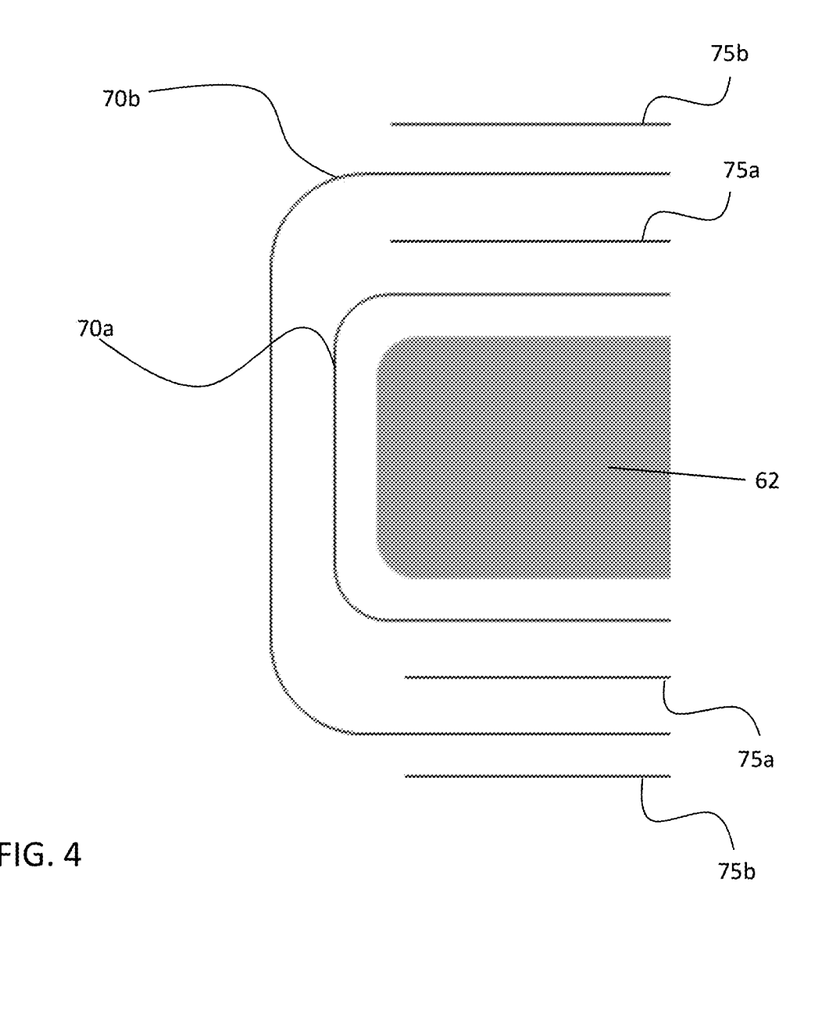
FIG. 4 is an exploded partial cross-section of the high modulus and intermediate modulus layers of a spar arranged about a mandrel according to an embodiment of the invention.
Figure 5:
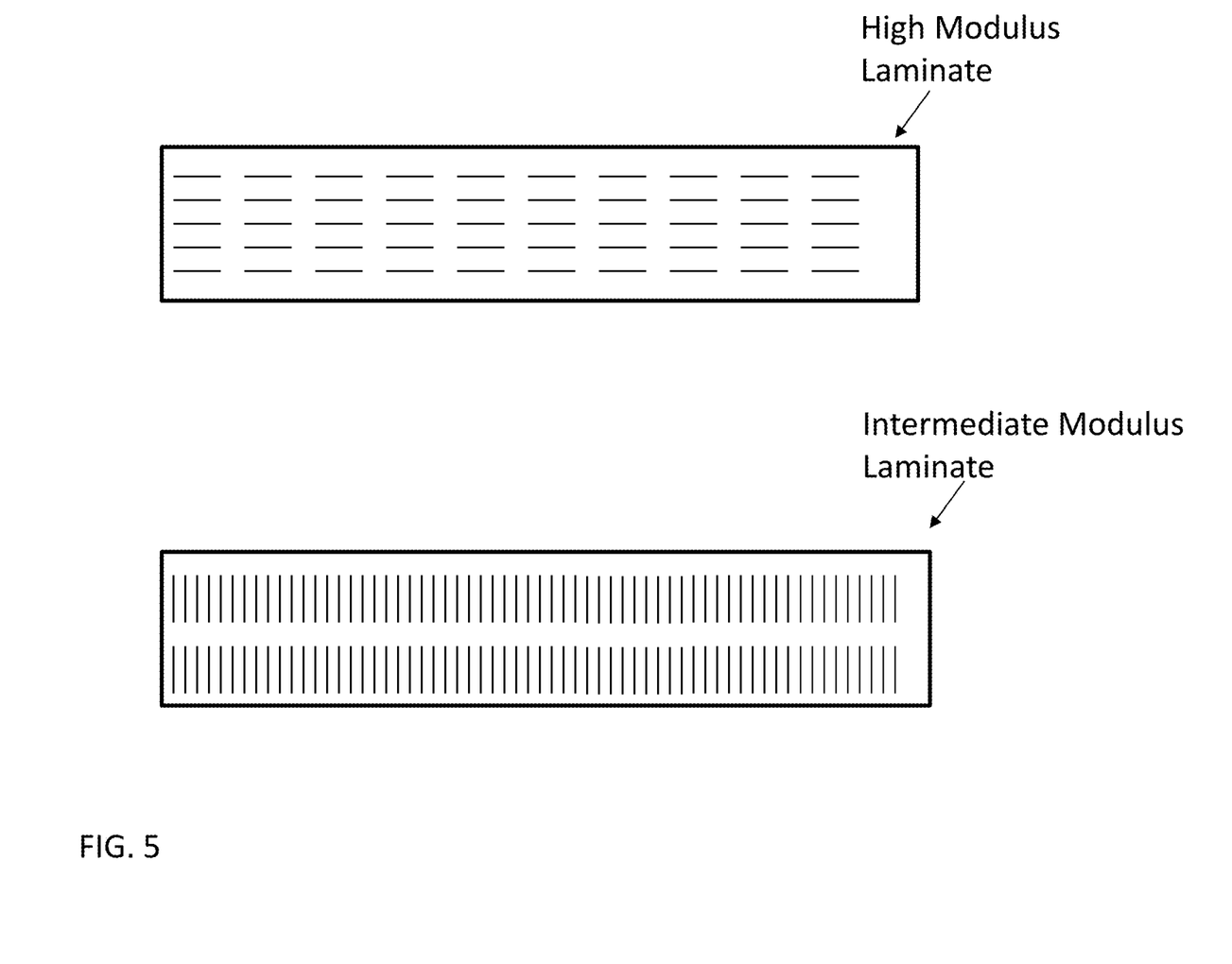
FIG. 5 is a top view of a high modulus laminate and an intermediate modulus laminate according to an embodiment.

Referring now to FIG. 4, during manufacture, the intermediate modulus laminates and the high modulus laminates are arranged in generally concentric layers about a mandrel 62 to form the upper portion, lower portion, and conic leading and trailing edge sidewalls of the spar 40. Only a portion of the mandrel 62 is illustrated in the FIG. for clarity, and it is understood that post production the mandrel is removed to form the space 33 in the spar 30 as shown in FIG. 3. In the illustrated, non-limiting embodiment, an intermediate modulus layer 70a is wrapped about the circumference of the mandrel 62 to form the interior surface of the spar 40. The intermediate modulus layer 70a includes one or more intermediate modulus laminates, having either a cross-ply or unidirectional orientation. In embodiments where the intermediate modulus layer 70a includes a plurality of cross-ply laminates, the laminates may have similar or different fiber orientations so as to run at angles relative to the spanwise direction. Where the laminates have unidirectional orientations, the fibers can run in the spanwise direction as an example, although the invention is not limited thereto.

A high modulus layer 75a including one or more high modulus laminates is positioned over at least a portion of the intermediate modulus layer 70a. In one embodiment, the high modulus layer 75a is arranged over the portion of the intermediate modulus layer 70a configured to define the upper wall 45 and the lower wall 47 of the spar 40. The one or more high modulus laminates of the high modulus layer 75a may have either a unidirectional or a cross-ply orientation, and may have similar or different fiber orientations. In one embodiment, the at least one high modulus laminate has a generally unidirectional orientation and the high modulus fibers are arranged generally parallel to the longitudinal axis of the laminate so as to run in the spanwise direction. In addition, the high modulus layer 75a includes more individual plies than the adjacent intermediate modulus layer 70a.

Encasing the high modulus layer 75a and the portion of the initial intermediate modulus layer 70a that defines the conic leading edge sidewall 48 and trailing edge sidewall 49 of the spar 40 is another intermediate modulus layer 70b. As previously described, the intermediate modulus layer 70b may include any number of intermediate modulus laminates, each having either a cross-ply or unidirectional orientation. The intermediate modulus layer 70b may, but need not be identical to the intermediate modulus layer 70a. The number of intermediate modulus laminates may be the same or different from the number of intermediate modulus laminates in the initial layer 70. Similarly, another high modulus layer 75b is positioned over at least a portion of the intermediate modulus layer 70b, such as the portion of the intermediate modulus layer 70b that defines the upper wall 45 and the lower wall 47 of the spar 40. The high modulus layer 75b may, but need not be, substantially identical to the previous high modulus layer 75a and may include laminates having either a cross-ply or unidirectional orientation. The two intermediate modulus layers 70 and two high modulus layers 75 of the spar 40 illustrated in FIG. 4 are provided only as an example, and a spar 40 having any number of interposed layers 70, 75 is within the scope of the embodiment.

By forming the composite spar 40 using a combination of high modulus graphite fibers and intermediate modulus graphite fibers, the overall stiffness of the spar 40 is increased. In addition, by positioning the plies having high modulus graphite fibers in the upper and lower walls of the spar, the overall thickness and therefore weight of the spar 40 is reduced.

While the invention has been described in detail in connection with only a limited number of embodiments, it should be readily understood that the invention is not limited to such disclosed embodiments. By way of example, while described in terms of a spar used in a helicopter blade, it is understood that aspects can be used in fixed wing aircraft wings and/or propellers, wind turbines, or other like applications. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A composite spar having an upper and lower wall region connected by leading and trailing edge regions, the spar comprising:
   a plurality of first laminates including one or more plies of graphite fibers having an intermediate modulus, the plurality of first laminates being arranged in one or more intermediate modulus layers, each of the intermediate modulus layers extends about a periphery of the spar; and a plurality of second laminates including one or more plies, wherein each ply of the one or more plies of each of the plurality of second laminates includes graphite fibers having a high modulus, which is higher than the intermediate modulus, the plurality of second laminates being arranged in one or more high modulus layers, the high modulus layers being generally interposed between intermediate modulus layers, and a total number of plies in the high modulus layers is greater than a total number of plies in an adjacent intermediate modulus layer, wherein each of the plurality of second laminates overlaps a portion of an adjacent one of the plurality of first laminates.

2. The composite spar according to claim 1, wherein the spar includes an upper wall region, a lower wall region, a leading edge conic region and a trailing edge conic region, and the high modulus layers are arranged only within the upper wall region and the lower wall region.

3. The composite spar according to claim 1, wherein the plies of graphite fibers having an intermediate modulus have a stiffness between about 18 megapounds per square inch (msi) and about 22 megapounds per square inch (msi).

4. The composite spar according to claim 1, wherein the plies of graphite fibers having a high modulus have a stiffness between about 25 megapounds per square inch (msi) and about 37 megapounds per square inch (msi).

5. The composite spar according to claim 1, at least one of the plurality of first laminates may be a unidirectional laminate.

6. The composite spar according to claim 5, wherein at least one of the plurality of second laminates includes fibers oriented generally parallel to a longitudinal axis.

7. A method of forming a spar, comprising:
wrapping an intermediate modulus layer including one or more plies of graphite fibers having an intermediate modulus about a periphery of a mandrel;
arranging a high modulus layer including one or more plies, over a portion of the intermediate modulus layer, wherein each ply of the one or more plies in the high modulus layer includes graphite fibers having a high modulus and a total number of plies in the high modulus layer is greater than a total number of plies in an adjacent intermediate modulus layer; and
positioning another intermediate modulus layer about the periphery of the mandrel such that the high modulus layer is interleaved between the intermediate modulus layer and the another intermediate modulus layer, wherein layers of the spar having one or more plies of graphite fibers having an intermediate modulus extend about the periphery of the mandrel.

8. The method according to claim 7, wherein the high modulus layer is arranged over only a first surface and a second opposite surface of the mandrel to form a portion of an upper wall region and a lower wall region of the spar.

9. The method according to claim 7, further comprising:
arranging another high modulus layer including one or more plies of graphite fibers having the high modulus over a portion of the another intermediate modulus layer; and
positioning a further intermediate modulus layer about the periphery of the another intermediate modulus layer such that the another high modulus layer is interleaved between the further intermediate modulus layer and the another intermediate modulus layer.

10. A rotor blade for a rotary wing aircraft, comprising:
a substantially hollow spar, the spar including:
a plurality of first laminates including one or more plies of graphite fibers having an intermediate modulus, the plurality of first laminates being arranged in one or more intermediate modulus layers, each of the intermediate modulus layers extending about a periphery of the spar; and
a plurality of second laminates including one or more plies, wherein each ply of the one or more plies of each of the plurality of second laminates includes graphite fibers having a high modulus which is higher than the intermediate modulus, the plurality of second laminates being arranged in one or more high modulus layers, the high modulus layers being generally interposed between intermediate modulus layers, a total number of plies in the high modulus layer is greater than a total number of plies in an adjacent intermediate modulus layer, wherein each of the plurality of second laminates overlaps only a portion of an adjacent one of the plurality of first laminates;
a plurality of airfoil blocks positioned about the spar to define an airfoil shape; and
at least one skin extending around an exterior of the plurality of airfoils blocks to define a smooth exterior surface.

11. The rotor blade according to claim 10, wherein the spar includes an upper wall regio, a lower wall region, a leading edge conic region and a trailing edge conic region, and the high modulus layers are arranged only within the upper wall region and the lower wall region.

12. The rotor blade according to claim 10, wherein the plies of graphite fibers having an intermediate modulus have a stiffness between about 18 megapounds per square inch (msi) and about 22 megapounds per square inch (msi).

13. The rotor blade according to claim 10, wherein the plies of graphite fibers having a high modulus have a stiffness between about 25 megapounds per square inch (msi) and about 37 megapounds per square inch (msi).

14. The rotor blade according to claim 10, wherein at least one of the plurality of first laminates may be a unidirectional laminate.

15. The rotor blade according to claim 14, wherein at least one of the plurality of second laminates include fibers oriented generally parallel to a longitudinal axis.

* * * * *